United States Patent Office 2,772,308
Patented Nov. 27, 1956

2,772,308

CYCLOALKANE PHOSPHONYL CHLORIDES

Warren Jensen, Ponca City, Okla., and James O. Clayton, Berkeley, Calif., assignors to California Research Corporation, San Francisco, Calif., a corporation of Delaware No Drawing. Application July 6, 1954,
Serial No. 441,665

1 Claim. (Cl. 260—543)

This invention relates to new phosphorus-containing compounds, in particular, cycloalkane phosphonyl dichlorides.

This application is a continuation-in-part of U. S. Patent 2,683,169 (filed June 11, 1952) and U. S. Patent 2,683,168 (filed December 22, 1950). This latter application is a continuation-in-part of application Serial No. 86,856 (filed April 11, 1949, and which has been abandoned), which in turn was a continuation-in-part of application Serial No. 716,182 (filed December 12, 1946, and which has been abandoned).

Phosphonyl chlorides and their derivatives are useful in various arts. For example, certain phosphonyl chloride derivatives (e. g., phosphonic acids and salts and esters thereof) are useful as lubricating oil additives, fire retardants, and textile treating agents; others are useful in the preparation of wetting agents, emulsifying agents, plasticizers, dispersing agents; and still others are useful as antistripping agents for asphalt paving compositions, asphalt pipe-coating compositions, etc.

The particular class of new compounds of this invention is useful as intermediates in the manufacture of insecticides, anti-preignition agents in gasolines, intermediates for pesticides, etc.

It is a primary object of this invention to set forth new phosphorus-containing compounds.

We have discovered cycloalkane phosphonyl chlorides, which are new compounds having unique properties. These compounds have the generic formula:

$$R-\overset{O}{\underset{Cl}{\overset{\|}{P}}}-Cl$$

wherein R is a cycloalkane radical.

Examples of R radicals include the radicals derived from cyclobutane, cyclopentane, cyclohexane, cycloheptane, cyclooctane, etc.

The new cycloalkane phosphonyl dichlorides of this invention include cyclobutane phosphonyl dichloride, cyclopentane phosphonyl dichloride, cyclohexane phosphonyl dichloride, cycloheptane phosphonyl dichloride, cyclooctane phosphonyl dichloride, etc.

Alkane phosphonyl dichlorides are also obtained from cycloaliphatic hydrocarbons, such as cyclohexane, methyl cyclohexane, diethyl cyclohexane, cetyl cyclohexane, tetralin, etc.; aliphatic hydrocarbons, such as propane, butane, isobutane, pentane, 2-methyl pentane, 3-methyl pentane, hexane, heptane, octane, isooctane, decane, tetradecane, hexadecane, octadecane, and hydrogenated olefin polymers; mixtures of hydrocarbons, e. g., gasoline, kerosene, mineral lubricating oil fractions, paraffin wax, etc.

A method of preparing these new compounds includes the reaction of a cycloalkane with phosphorus trichloride in the presence of oxygen. This particular method is presented in the following equation:

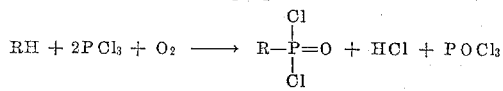

wherein RH represents a cycloalkane.

This reaction may be carried out in the gaseous or liquid phase, the temperature varying from elevated temperatures to subzero temperatures. However, it is preferred to operate well below cracking temperatures of the cycloalkane reactant. The most advantageous range of temperature is about −70° C. to about +75° C.

The proportions of reactants may be varied considerably. As the molar ratio of phosphorus trichloride to cycloalkane is increased, the yield of the phosphonyl dichloride, based on the cycloalkane charged, increases.

The rate of addition of oxygen does not appear to affect the yield or purity, but as the rate of oxygen input is increased, evolution of heat also increases and more cooling is usually necessary. It is preferred to use an excess of oxygen, but it is also generally beneficial to use such an amount as will permit maintaining the reaction temperature between 0° C. and 75° C.

The physical conditions under which the reaction is carried out will depend to a considerable degree upon the nature of the reactants. Thus, phosphorus trichloride is relatively volatile (boiling point, 76° C.), hence, unless pressure is used or unless a recovery system for vaporized phosphorus trichloride is used, the reaction temperature will be kept below 76° C. Where a volatile hydrocarbon reactant, such as propane or butane, is employed, it may be necessary to use a pressure system for the reactants. Similarly, if the reaction is made at a temperature above that of the boiling point of phosphorus trichloride (76° C.), it may be necessary to use a pressure system.

Phosphonyl dichlorides may be treated with water to produce the corresponding phosphonic acids by hydrolysis. Where the resulting phosphonic acids are water-soluble, they may be extracted with water. Where the phosphonic acids produced by hydrolysis are water-insoluble, the reaction mixture may be extracted with an aqueous alcoholic solution of caustic alkali, and the alkaline extract acidified to precipitate the free acids.

Phosphonic acids may be reacted with basic substances to form the corresponding salts. For example, the phosphonic acids may be reacted with sodium hydroxide to prepare the sodium salts of the phosphonic acids. Other metal salts which may be prepared include potassium, lithium, selenium, calcium, barium, zinc, aluminum, lead, etc.

In describing the preparation of the new compounds of this invention in the specific examples below, oxygen is bubbled through a mixture of an alkane and phosphorus trichloride while the temperature is maintained at 55° to 60° C. Unreacted alkane and the by-product, phosphorus oxychloride, are removed from the reaction mixture by distillation at reduced pressure. The crude organo-phosphonyl chloride is then distilled off and purified further by redistillation.

The specific examples described hereinbelow will serve further to illustrate the practice and advantages of the invention.

*Example 1.—Preparation of cyclohexane phosphonyl chloride and cyclohexane phosphonic acid*

6.5 parts by weight of phosphorus trichloride and 1 part by weight of cyclohexane (molar ratio of PCl₃ to cyclohexane of 4) were mixed together at room temperature and placed in a glass cylinder having a sintered glass bubbling plate at the bottom and fitted with a condenser and a thermometer. When oxygen was bubbled into the solution of cyclohexane and phosphorus trichloride, the temperature quickly rose to 60° C. By means of a water bath, the temperature during the reaction was maintained between 55 to 60° C. The oxygen bubbling was continued until the exothermic effect ended and the temperature returned to room temperature. The reaction mixture was first distilled under vacuum to distill off the cyclohexane, POCl₃, and the crude cyclohexane phosphonyl chloride. The crude cyclohexane phosphonyl chloride was then distilled at reduced pressure to obtain the pure cyclohexane phosphonyl chloride, which distilled over at temperatures ranging from 127 to 128° C. and an absolute pressure of 15 mm. of mercury. The following analytical data were obtained on a pure sample which crystallized on standing:

|  | Found | Calculated for $C_6H_{11}POCl_2$ |
|---|---|---|
| P, Percent | 15.1, 15.1 | 15.4 |
| Cl, Percent | 33.9, 33.4 | 35.3 |
| Melting Point, °C | 37.0-37.5 |  |

A sample of the above cyclohexane phosphonyl chloride was hydrolyzed with water. The water solution was concentrated to one-fourth its volume and cooled, whereupon colorless needles separated out. The following analytical data were obtained on these crystals:

|  | Found | Calculated for $C_6H_{11}PO(OH)_2$ |
|---|---|---|
| P, Percent | 18.7, 18.8 | 18.9 |
| Equivalent wt. (g.) | 82 | 82 |
| Melting Point, °C | 166-167 |  |

*Example II.*—Preparation of heptane phosphonyl chloride and heptane phosphonic acid 5.5 parts by weight of phosphorus trichloride and 1 part by weight of n-heptane (molar ratio of PCl₃ to n-heptane of 4) were mixed together and placed in the same glass apparatus described in Example I. Oxygen was bubbled through this mix at 55 to 60° C. until the reaction was complete, which was noted by the drop in temperature. The following analytical data were obtained on the distilled heptane phosphonyl chloride, which was a colorless liquid distilling over at the temperature range of 166-167° C. at an absolute pressure of 15 mm. of mercury:

|  | Found | Calculated for $C_7H_{15}POCl_2$ |
|---|---|---|
| P, Percent | 14.5, 14.5 | 14.3 |
| Cl, Percent | 32.7, 33.0 | 32.7 |

The heptane phosphonyl chloride was hydrolyzed with water to give a colorless, viscous liquid. The following analytical data were obtained on this heptane phosphonic acid:

|  | Found | Calculated for $C_7H_{15}PO(OH)_2$ |
|---|---|---|
| P, Percent | 16.8, 16.9 | 17.2 |
| Equivalent wt. (g.) | 89.5 | 90.0 |

*Example III.*—Preparation of methylpentane phosphonyl chloride and methylpentane phosphonic acid A mixture of 7.9 parts by weight of phosphorus trichloride and 1 part by weight of 3-methylpentane (molar ratio of PCl₃ to 3-methylpentane of 4) was placed in the same glass apparatus described in Example I. Oxygen was bubbled through this mix at 55-60° C. until the reaction was complete. The following analytical data were obtained on the distilled methylpentane phosphonyl chloride and on the methylpentane phosphonic acid resulting from the hydrolysis of the chloride with water:

| The Chloride | Found | Calculated for $C_6H_{13}POCl_2$ |
|---|---|---|
| P, Percent | 14.9, 15.4 | 15.3 |
| Cl, Percent | 37.0, 37.1 | 35.0 |

| The Acid | Found | Calculated for $C_6H_{13}PO(OH)_2$ |
|---|---|---|
| P, Percent | 18.2, 18.5 | 18.7 |
| Equivalent wt. (g.) | 82.9 | 83.0 |
| Melting Point, °C | 127-131 |  |

*Example IV.*—Preparation of petroleum white oil phosphonyl chloride

A mixture of 4.1 parts of phosphorus trichloride and 3 parts by weight of petroleum white oil[1] (molar ratio of PCl₃ to white oil of 5) was placed in the same glass apparatus described in Example I. Air was bubbled through the mix at a temperature range of 55-60° C. until the reaction was complete. This product was then hydrolyzed with water to the phosphonic acid, which was shown by the analytical data to contain 5.2% phosphorus; the calculated value for one phosphorus atom per molecule is 5.3% phosphorus.

*Example V.*—Preparation of phenyloctadecane phosphonyl chloride and phenylocetadecane phosphonic acid A mixture of 1.6 parts by weight of phosphorus trichloride and 1 part by weight of octadecylbenzene was placed in the usual glass apparatus. Oxygen was bubbled through this mix at 55 to 60° C. until the reaction was complete. The phenyloctadecane phosphonyl chloride was hydrolyzed to the phenyloctadecane phosphonic acid.

Other compounds are obtained further by the reaction of various alkylene oxides with the cycloalkane phosphonyl chlorides of this invention. As exemplified in Example VI hereinbelow, esters are obtained by reacting a phosphonyl dichloride with a polyhydroxy alcohol.

*Example VI.—Bis(2-hydroxyethyl) dodecane phosphonate*

To a mixture of 1 part by weight of ethylene glycol and 1.7 parts by weight of pyridine was slowly added 1.6 parts by weight of dodecane phosphonyl dichloride. After the mixture had been standing for 15 minutes, it was heated on a steam bath for 20 minutes. The resulting mixture was cooled to room temperature, then diluted with 1 part by weight of water. This diluted mixture was acidified with hydrochloric acid. The resulting upper oily phase was extracted with 20 grams of ethyl ether. The ether solution was washed with a saturated water solution of sodium sulfate, then dried. When the ether had been removed, the product was a light-colored oil having the formula:

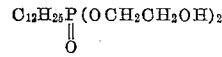

We claim:

The compound, cyclohexane phosphonyl dichloride.

References Cited in the file of this patent

UNITED STATES PATENTS

| 2,071,017 | Bass | Feb. 16, 1937 |
| 2,683,168 | Jensen et al. | July 6, 1954 |
| 2,683,169 | Jensen et al. | July 6, 1954 |

OTHER REFERENCES

Mellor: Comprehensive Treatise on Inorganic and Theoretical Chemistry, vol. 8, pages 1019 to 1020.

Jensen et al.: 71 J. A. C. S. 2384-5.

---

[1] The petroleum white oil had an average molecular weight of 500, a naphthene content of 20%, and a paraffin content of 80%.